United States Patent [19]

Paschen et al.

[11] 4,283,285

[45] Aug. 11, 1981

[54] APPARATUS FOR THE PRODUCTION OF MOLDED BODIES FROM FILTER CAKES

[75] Inventors: Peter Paschen; Chatty Rao, both of Bergisch-Gladbach; Helmut Preuss, Bornheim-Walberberg, all of Fed. Rep. of Germany

[73] Assignee: Klöckner-Humboldt-Deutz AG, Fed. Rep. of Germany

[21] Appl. No.: 69,793

[22] Filed: Aug. 27, 1979

Related U.S. Application Data

[63] Continuation of Ser. No. 936,750, Aug. 25, 1978, abandoned.

[30] Foreign Application Priority Data

Aug. 25, 1977 [DE] Fed. Rep. of Germany ....... 2738239

[51] Int. Cl.³ .............................................. B01D 33/08
[52] U.S. Cl. ................................... 210/326; 210/330; 210/404; 210/456
[58] Field of Search ............... 210/326, 327, 330, 384, 210/386, 402, 404, 406, 456, 485, 489, 405, 416 R, 497 R, 497.1; 209/270, 288, 289, 45, 46; 162/302, 331; 425/84, 85

[56] References Cited

U.S. PATENT DOCUMENTS

| 1,449,774 | 3/1923 | Najarian | 210/386 |
| 1,884,583 | 10/1932 | Crawford | 162/331 |
| 2,741,369 | 4/1956 | Fest | 210/404 |
| 3,971,720 | 7/1976 | Swanson et al. | 210/196 |
| 4,102,791 | 7/1978 | Otte | 210/326 |

FOREIGN PATENT DOCUMENTS

1920919 3/1977 Fed. Rep. of Germany .......... 210/326

Primary Examiner—Ernest G. Therkorn
Assistant Examiner—David R. Sadowski
Attorney, Agent, or Firm—Hill, Van Santen, Steadman, Chiara & Simpson

[57] ABSTRACT

An apparatus for producing agglomerates from a rotary filter such as a rotating filter drum, which includes a perforated filter member on the filter, a slotted member disposed on the filter member and a sludge or slurry storage means disposed above the slotted member, the storage means discharging solid particles of the sludge into the slotted member essentially in the direction of solid sedimentation.

1 Claim, 15 Drawing Figures

APPARATUS FOR THE PRODUCTION OF MOLDED BODIES FROM FILTER CAKES

This is a continuation of application Ser. No. 936,750, filed Aug. 25, 1978 now abandoned.

BACKGROUND OF THE INVENTION

1. Field of the Invention

This invention is in the field of producing agglomerates such as ore pellets from filter cakes produced in a solidsliquid filter.

2. Description of the Prior Art

There are available methods and apparatus for the agglomeration of fine grained iron ore such as the ores present in sludge, from which the agglomeration takes place during and with the aid of a filtering-dehydration step. The agglomerates thus formed are conveyed to a calcining operation. An example of this type disclosure would be found in German Pat. No. 1,920,219.

In the known method, the steps of filtering-hydration and the agglomeration are carried out simultaneously. With this type of method, relatively dense agglomerates can be produced from the ore sludge, the agglomerates being adapted to a subsequent drying and sintering operation.

Another apparatus consists of a rotatable filter drum which is partially immersed in the ore sludge, with a filter cake depositing on the surface of the filtered drum. An endless slotted band is provided about the filter cake in the immersion area of the filter drum that is moved together with the filter drum. In the intermediate spaces, the filter cake is deposited on the filter drum surface in the form of individual agglomerates. The endless slotted band with the encased agglomerates is then conveyed to a device which releases the agglomerates from the slotted band openings. In this type of apparatus, the sludge storage for feeding the filtered side is disposed on the lower side of the filter drum and is immersed therein.

This type of apparatus operates without significant difficulty and supplies relatively dense agglomerates in satisfactory quality and quantity. Both the quality and the quantity of the agglomerates are improved as the weight of the sludge or the sludge density increases. The method becomes more economical with a wider spectrum of grain sizes. To a certain degree, a relatively widely dispersed grain spectrum is beneficial in the subsequent process steps of drying and sintering, as well as utilization of the agglomerates as feed material for a blast furnace, or as material to be used in a direct reduction process, for example, in a rotary kiln.

With increasing sludge weights and individual grain sizes, however, with a sludge storage chamber disposed below the filter, a certain amount of undesirable sedimentation of the solid particles in the sludge storage occurs, requiring stoppage of the equipment. This condition limits the efficient carrying out of the process since the strong turbulence in the sludge bath required for making a uniform dispersion disturbs or even prevents the formation of the filter cake in the multi-cavity slotted band. There is also an additional disadvantage in that the fine parts of the sludge arrive first at the filter medium to impair its permeability and accordingly impair the filtering function.

SUMMARY OF THE INVENTION

In one preferred embodiment of the present invention we provide a drum filter such as a drum plate filter with a sludge storage compartment arranged above the axis of the drum and front sides which are connected in close proximity to the front sides of the drum. The sealing problem which is inherent in such an arrangement is controlled in one embodiment of the invention by providing a roller made of a soft elastic material extending laterally on the filter drum and sealingly engaging the multi-cavity slotted device. Baffle walls are provided which cooperate with the front sides of the filter drum such that a gap shape chamber forming a sludge storage compartment is formed between the filter drum and the roller.

In an alternative embodiment, the chamber for holding the sludge is formed between two rollers disposed on opposite sides of the zenith of the drum.

A still further embodiment of the invention provides a sludge storage compartment by means of a chamber or space in the gap between two oppositely rotating filter drums.

The apparatus of the present invention can be operated with extremely high density sludges with a widely dispersed grain spectrum, without the utilization of agitation devices.

DESCRIPTION OF THE PREFERRED EMBODIMENTS

In accordance with the present invention, the storage of the sludge takes place above the multi-cavity slotted device such that the deposition of the solid particles into the cavities takes place substantially along the sedimentation direction of the particles. The present invention can therefore make use of coarser and heavier particles which precipitate out of the sludge and onto the filter surface first thereby to form an ideal intermediate filter for the further depositing of the fine and finest particles of the solids contained in the sludge.

It has heretofore been known to arrange a sludge storage compartment above the filter medium where the filter apparatus was not provided with any slotted device. However, in the case where a filter apparatus is provided with a filter medium covered with a grid type band, and highly abrasive sludges are being processed, the disposition of the sludge storage above the slotted band was regarded as impossible because of the difficulty of sealing as well as the wear which resulted.

In order to overcome sealing difficulties, resulting at the contact line of the filter drums, particularly where relatively coarse agglomerates are being made, the lower closure of the chamber between the two non-contacting filter drums is formed by means of two rollers made of soft elastic material which are in sealing engagement with their respective drums and with one another. The front sides of these rollers are connected with the filter drums through baffle walls. This particular form of the invention has the advantage that the capacity of the sludge storage compartment in the space between the drums can be substantially enlarged.

In a preferred embodiment of the invention, the slotted device is fixedly connected with the filter medium. This can be accomplished because of the manner in which sedimentation takes place in accordance with the present invention, namely, the heavier and coarser particles are first deposited in the cavities, followed by the finer and finest particles. Consequently, the release of the agglomerates from the cavities can be accomplished without great difficulties.

An alternative form of the apparatus utilizes a band filter, preferably a vacuum sieve band filter. This apparatus has the advantage of being simple, economical, and provides a relatively large output.

Corresponding advantages are also achieved through the utilization of a band plate filter, preferably a box band filter with a vacuum suction device. This type of filter apparatus is adapted particularly to the use of cavities made of metal whose surfaces are made wear resistant by means of chrome plating.

In a preferred embodiment of the invention, a container is provided above the sludge storage compartment and provided with a sludge circulation means and level regulating means. The container discharges into the sludge storage compartment below the level of the sludge with outlet openings directed essentially against the filter surface, and is suitably positioned with respect to the container so that the sludge is introduced essentially by means of laminar flow into the sludge storage compartment. The container itself may be equipped with an agitation device.

The grid type band may further consist of segments which together with the filter coating are fixed by means of releasable connecting elements with the filter frame.

Figures 1, 3:
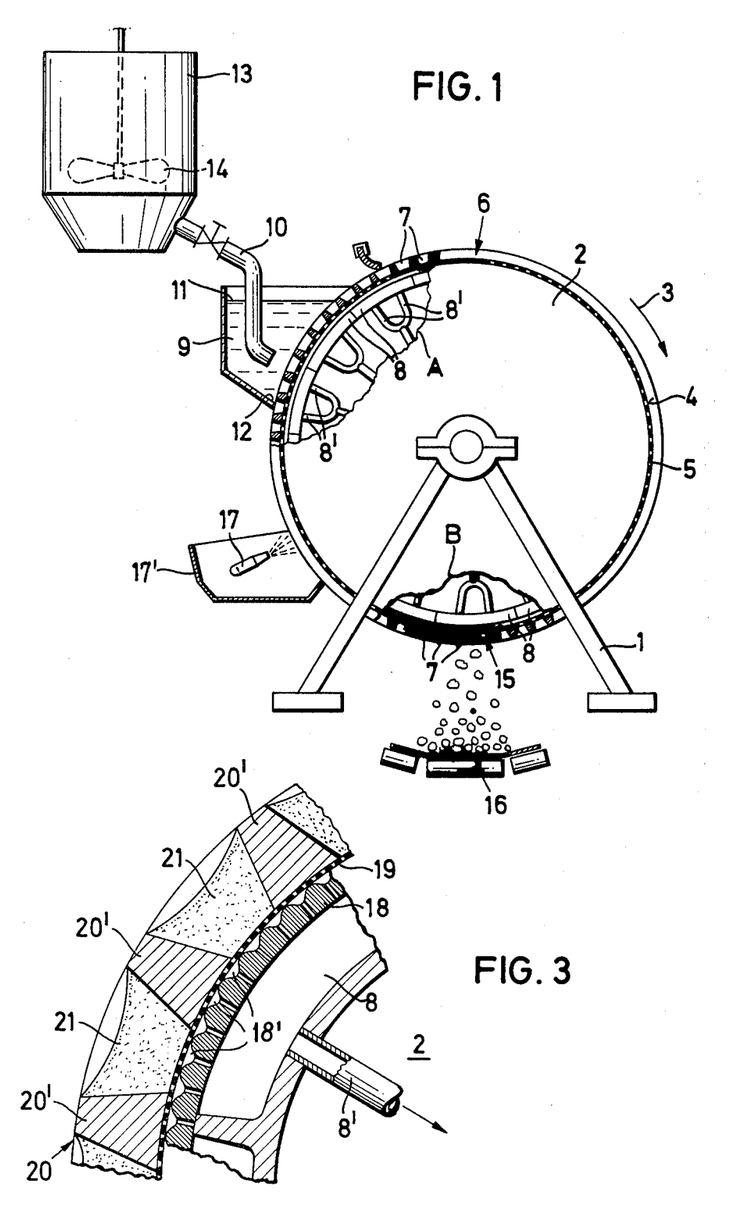
FIG. 1 illustrates a rotary drum type filtering apparatus partly in elevation and partly in cross-section embodying the principles of the present invention.
FIG. 3 is a greatly enlarged fragmentary cross-sectional view of a portion of the device shown in FIG. 2.

Turning now to the drawings, in FIG. 1 there is shown a supporting frame 1 where it supports a rotary plate filter drum 2. The drum is driven in the direction of the arrow 3 by means of a suitable drive, not shown. On the surface 4 of the filter there is tensioned a filter cloth 5 which serves as a filter medium. For purposes of illustration, the filter is shown in the form of an interrupted line. On this filter cloth 5, there is arranged a multi-cavity band member or grid 6 which has cavities 7. The cavities are shown by broken away portions A and B in FIG. 1. The broken away portions also illustrate vacuum chambers 8 and suction channels 8' which provide the vacuum at the surface of the filter.

The vacuum plate filter 2 is equipped with a sludge storage compartment 9 arranged laterally above the drum axis. A sealing means is provided at the lower edge 12 to seal the storage compartment 9 preferably at an adjustable level with respect to the filter drum 2. A charging vessel 13 discharges the sludge beneath the sludge level 11 by means of a discharge device 10. The charging vessel 13 may be equipped with an agitator member 14.

The filter drum 2 is also equipped with an air control by means of which a low vacuum is produced in the lower area 15 whereby the agglomerates formed in the suction area and dried during a rotation of the drum 2 by approximately 180° are ejected from the cavity 7 and dropped onto a conveyor belt 16.

In FIG. 1, there is also shown a washing arrangement which includes a spray device 17 and a collection trough 17'.

Figure 2:
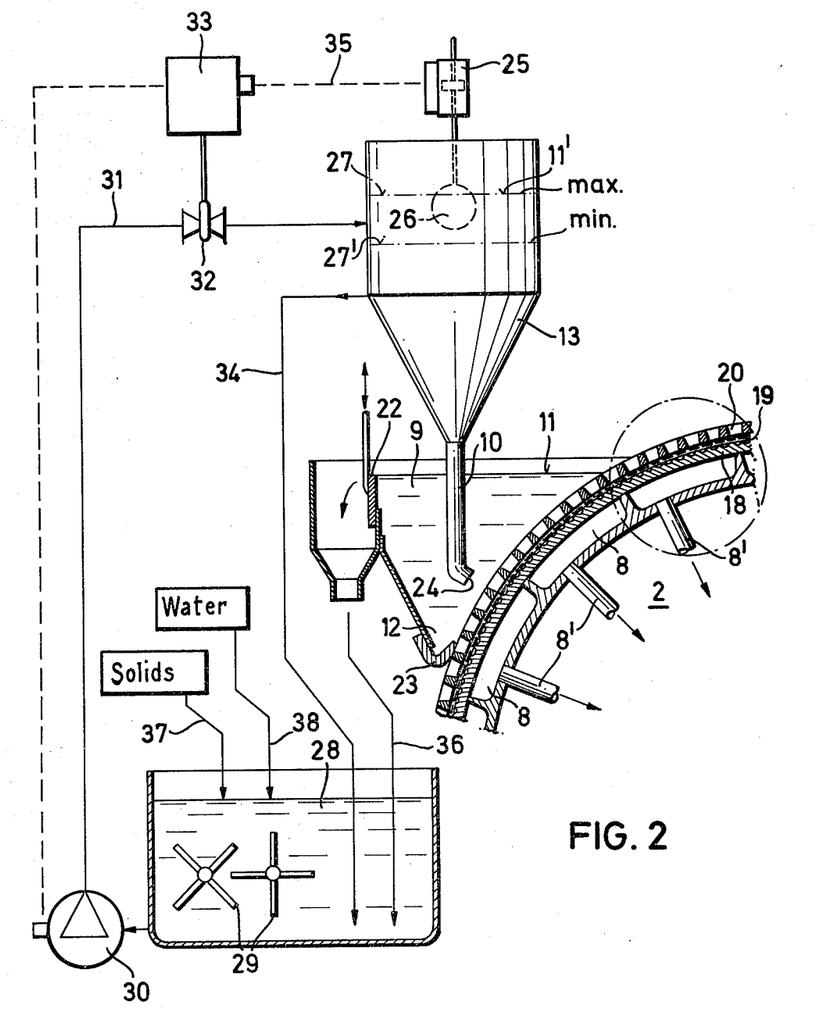
FIG. 2 is a cut-away portion of FIG. 1 on an enlarged scale.

Further details of the apparatus are evident from FIG. 2. This Figure shows, partly in section, a part of the filter drum 2 with the vacuum chambers 8 as well as the vacuum conduits 8'. It will be seen that the outer sleeve 18 of the drum is provided on its surface with grooves and it carries a filter cloth 19 on which the mold cavity network 20 rests. For purposes of clarification, the area enclosed with the circle in FIG. 2 is shown in an enlarged view in FIG. 3 in cross-section. In this view, there will be seen the sleeve 18 of the drum 2 together with the grooves 18' on its upper side as well as the filter cloth 19 and ridges 20' of the grid type band 20. Between the ridges 20' may be seen filter cakes in the form of agglomerates 21.

As is further apparent from FIG. 2, the sludge storage compartment 9 is equipped with an adjustable overflow dam 22 where the sludge level 11 is held approximately constant independently of fluctuations in the feed to the charging arrangement 10. The sludge storage compartment 9 is equipped at the lower gap 12 with a resilient lip 23. Into the compartment 9, there discharges from the charging container 13 a charge 10 with an outflow 24 directed against the grid type band 20. The charging container 13 is equipped with a level sensor 25 which is controlled by means of a float 26. The level senser limits the level in the container 13 between an upper limit 27 and a lower limit 27'. The storage container 13 is part of a sludge circulation system comprising a storage and dispersing vessel 28 with an agitation member 29, a pump 30, a pressure conduit 31 with a regulating member 32 and an adjusting member 33 as well as a return conduit 34. The adjusting member 33 is controlled by the level tester 25 as indicated by the dash line connection 35. From the overflow dam 22 of the sludge storage compartment 9 there is a return conduit 36 directed into the storage container 28. In the container 28, there is introduced solids through a line 37 and water through a line 38 in predetermined ratios of weight. Then the two are mixed together by means of the agitator member 29, into a sludge. The pump 30 conveys the sludge by means of the pressure conduit 31 into the charging vessel 13. The sludge flows through the charging vessel 13 and runs back at least partially through the run-off conduit 34. In this manner, the flow necessary for preventing separation in the charging conduit 13 is maintained, and no harmful sedimentation may take place within this system and particularly within the charging conduit 13. The maintenance of the desired sludge level 11 within the upper limit 27 and the lower limit 27' is achieved by means of float 26 and level sensor 25 connected by means of line 35 with adjusting member 33 which actuates the regulating member 32. In this manner, the sludge storage compartment 9 is supplied through the discharge device 10 with sludge of uniform consistency in a laminar flow condition.

Because of the arrangement of the outflow 24 in relationship to the grid member 20 moving therebelow, it is important that the sedimentation direction of the solids portion of the sludge as well as the flow direction of the sludge leaving the outflow 24 approximately correspond with the charging direction of the filter cake in the cavity of the slotted device. Since the discharge of the sludge lies beneath the sludge level 11 in the vicinity of the gap 12, the coarser and/or heavier solids particles which concentrate to the lower areas of the sludge are first deposited on the filter cloth 19 while the finer and finest solids in the container to the sludge deposit thereover.

To facilitate undisturbed, uniform formation of the filter cake, the overflow dam 22 is adjusted so that the sludge is always at a uniform operating head.

Figure 4:
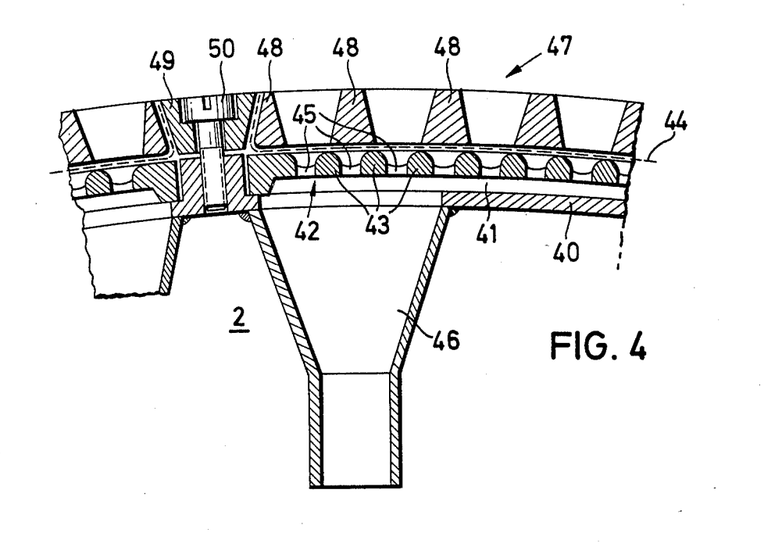
FIG. 4 is a fragmentary cross-sectional view illustrating how the components of the filter drum assembly are fastened together.

In FIG. 4, the portion of the periphery of the filter drum 2 is shown in cross-section on an enlarged scale. There is shown a drum sleeve 40 which forms a trough 41 in which there is inserted a perforated carrier plate 42. The latter has on its surface semi-circular carrier ridges 43 for the support of the filter cloth 44. Between these carrier ridges are located openings 45 for the discharge of the filtrate. A trough 41 is constructed as a vacuum chamber and is attached to a vacuum filtrate conduit 46 which discharges through a control device into the central filtrate offtake. The upper closure of the trough 41 is formed as a vaccum chamber by means of the grid type element 47 whose ridges 48 may likewise be seen in cross-section. The grid type element 47 is connected together with the filter cloth 44 as a single unit with the aid of clamping strips 49 as well as screws 50 which fixedly connect them with the drum sleeve 40.

Figure 5:
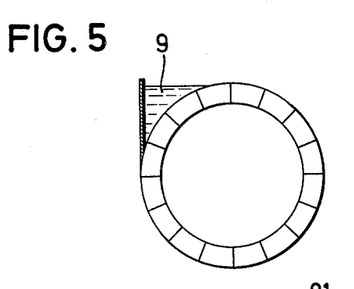
FIGS. 5 to 12 inclusive are diagrammetic showings of different types of sludge storage compartments which can be used in accordance with the present invention.

A number of different manners of arranging the sludge storage compartment with relationship to the filter are shown in FIGS. 5 to 12, inclusive. For example, FIG. 5 shows a vacuum plate filter with a side trough 9 and a sliding seal therebetween.

Figure 6:
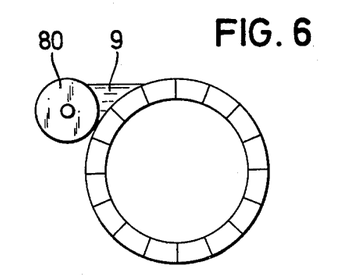

A similar arrangement with a lateral cloth 9 wherein the seal is provided by a roller 80 made of a highly elastic synthetic material, and rolling in sealed relationship with the filter drum is shown in FIG. 6.

Figure 7:
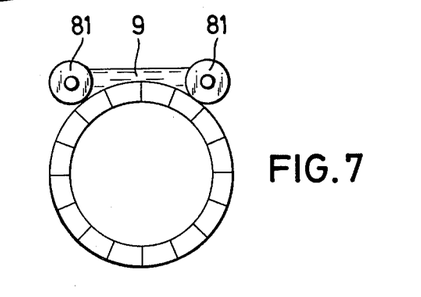
Figure 8:
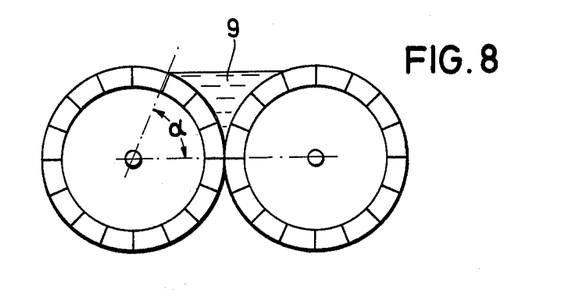

In the embodiment shown in FIG. 7, the sludge storage compartment 9 is formed by two rollers 81 engaging the periphery of the drum in spaced relation. FIG. 8 shows a double drum arrangement with a sludge storage compartment 9 lying therebetween, while FIG. 9 describes the further embodiment in which the seal between two non-contacting oppositely rotating filter drums 60, 60' consists of two oppositely rotating rollers 82 made of highly elastic, soft synthetic material, the rollers engaging their respective drums and engaging each other to provide a closure for the sludge storage compartment 9.

Figure 9:
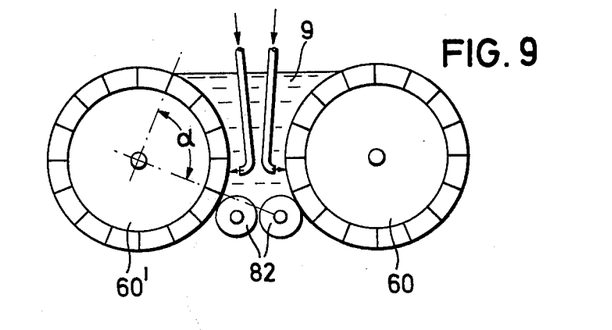

In comparing FIGS. 8 and 9, it will be noted that with the arrangement of FIG. 9, the sludge storage compartment 9 has a substantially greater volume than the arrangement shown in FIG. 8. In addition, the suction angle $\alpha$ in FIG. 9 is appreciably greater than it is in FIG. 8.

Figure 10:
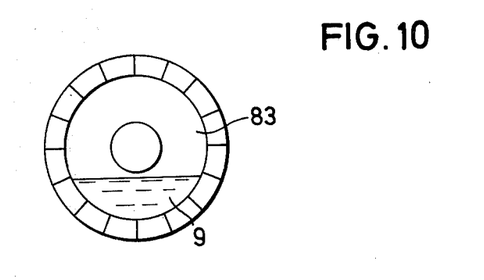

FIG. 10 is an embodiment of the invention illustrating the utilization of an inner filter 83.

Figure 11:
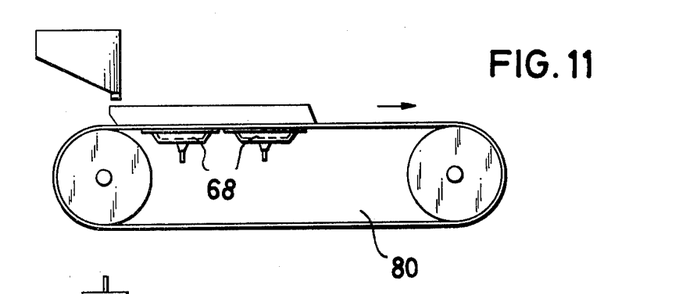
Figure 12:
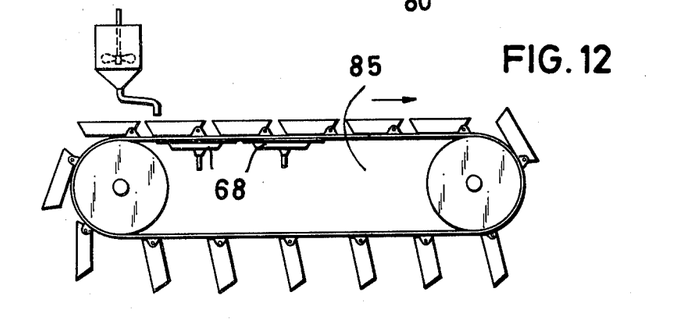

The utilization of a vacuum sieve band filter 84 is illustrated diagrammatically in FIG. 11. FIG. 12, likewise shows in diagrammatic form a box band filter 85 with suction being provided through vacuum devices 68.

Figure 13:
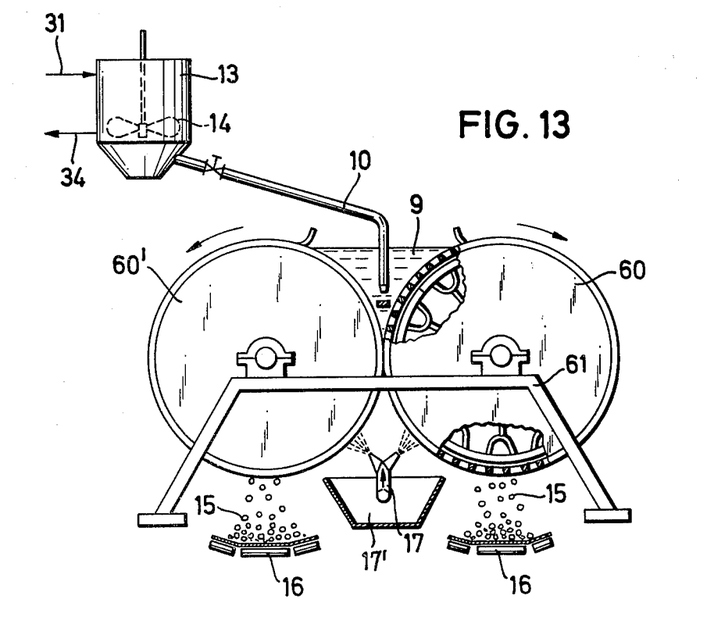
FIG. 13 is a view partly in elevation and partly in cross-section of a double drum filter.

The arrangement which is illustrated schematically in FIG. 8 is further clarified in FIG. 13. In this Figure, there is shown two oppositely rotating vacuum plate filter drums 60 and 60'. The latter are commonly supported on a carrier frame 61. Between the drum 60 and 60' there is a sludge storage compartment 9 with a charging conduit 10 dipping into the same. The latter is attached to the charging container 13 which is equipped with an agitator member 14 and, as explained in connection with FIG. 2, is attached through a feed conduit 31 and a return conduit 34 to a sludge circulation system shown in greater detail in FIG. 2.

Figure 14:
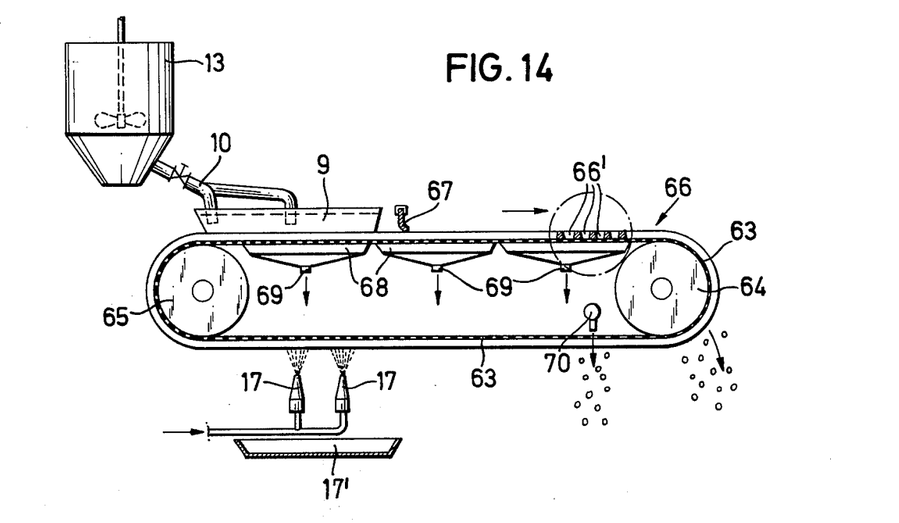
FIG. 14 is a semi-schematic representation of a vacuum sieve band filter.

The arrangement illustrated diagrammatically in FIG. 11 is shown in detail in FIG. 14. This embodiment has to do with a vacuum sieve band filter comprising two drums 64 and 65 covered by an endless filter cloth 63. The drum 64 is a drive drum and is connected to a driving unit, not shown. The drum 65 serves as a deflecting and tensioning station. A grid type band 66 having multi-cavities 66' is supported over the filter cloth 63. The cavities are shown in detail in the portion confined within the circle. Above the grid element 66, there is arranged a stationary sludge storage compartment 9 having discharge means 10 receiving sludge from the storage vessel 13. A smooth stripper 67 ensures that the cavities 66' of the grid type band 66 are not overly filled. Underneath the upper span of the grid type band 66 and the filter cloth 63 there are arranged suction chambers 68 with attached vacuum conduits 69 which lead to a central filtrate suction conduit, not shown in detail. This arrangement further includes a nozzle arrangement 70 for blowing blanks out of the cavities by means of compressed air, as well as a number of washing nozzles 17 for the cavities, and a collection groove 17' for wash water and waste materials.

Figure 15:
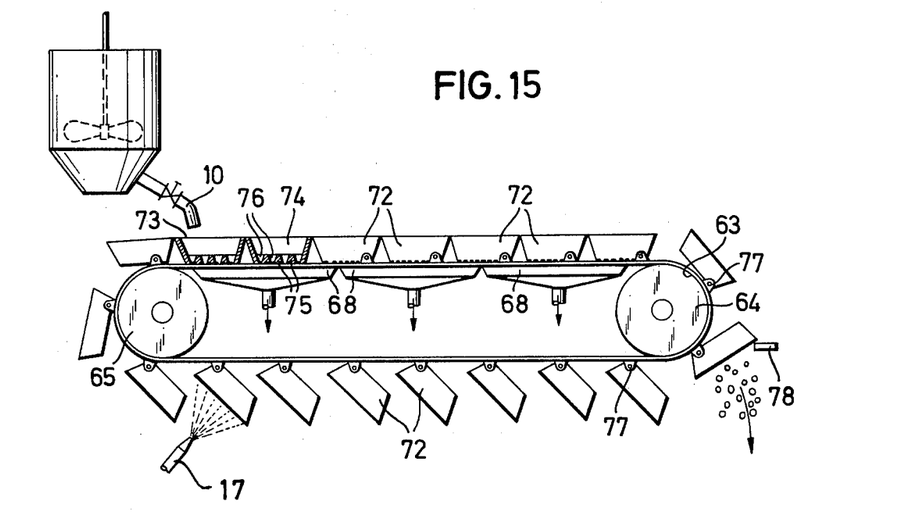
FIG. 15 is a semi-schematic representation of a vacuum box band filter.

An alternative form of a vacuum box band filter according to the showing of FIG. 12 is shown in greater detail in FIG. 15. This apparatus comprises two drums 64 and 65 which correspond in arrangement and function with those shown in FIG. 14. These drums are covered by the filter cloth 63 which is equipped with movably pivoted grid boxes 72. These boxes 72 are made of metal and are provided with a coating made of highly polished hard chrome. In the grid boxes 73 and 74 shown in section, there will be seen ridges 75 with cavities 76 lying therebetween. The suction of the filtrate takes place in similar manner as in the apparatus shown in FIG. 14, with the aid of vacuum chambers 68. In this device, the charging means 10 is so adjusted so that the grid boxes 72 are filled with certain height while they move past the charging device 10. Upon further transportation, the filtrate liquid is drawn off through the filter cloth 63 through and into the suction chambers 68 so that at the end of the travel, at least partially dried agglomerates are disposed in the grid boxes 72. As these filter boxes move about the driving station at the drum 64, the grid boxes 72 tilt about their axis of rotation 77 and strike against a stationary impact plate 78. As a result of the shaking which occurs, the agglomerates are ejected and dropped into a conveying device, not shown.

The embodiments and variations shown are to be understood solely by way of example. Further embodiments and arrangements can be made which fall under the present invention but which is limited only by the scope of the appended claims.

We claim as our invention :

1. An apparatus for producing agglomerates from an abrasive ore sludge which comprises:
   a pair of spaced oppositely rotating filter drums;

two perforate filter means respectively trained about the peripheries of said filter drums;

a means for applying vacuum inwardly of each said filter means;

two multi-cavity molding members respectively disposed over said filter means and each having cavities communicating with said means for applying vacuum;

a pair of rollers composed of soft elastic material and engaging each other and each roller also engaging a respective one of said filter drums;

said filter drums and said rollers forming a compartment between said filter drums and above said rollers for storage of sludge to be filtered adjacent said molding members; and a sludge discharge means extending into the sludge confined in said compartment and positioned therein to direct sludge into each said molding cavity in a direction of solid sedimentation thereby to direct heavier, more readily settling particles in the sludge into the molding cavities prior to lighter particles contained in the sludge.

* * * * *